United States Patent [19]

Fendley

[11] Patent Number: 4,828,524

[45] Date of Patent: May 9, 1989

[54] RAIL MAPPING METHOD AND APPARATUS

[75] Inventor: James R. Fendley, Arlington Heights, Ill.

[73] Assignee: Zenith Electronics Corporation, Glenview, Ill.

[21] Appl. No.: 140,070

[22] Filed: Dec. 31, 1987

[51] Int. Cl.[4] ........................ B23K 26/04; B23K 26.10; G05B 19/23

[52] U.S. Cl. ................................. 445/30; 219/121.64; 219/121.79; 318/572; 318/573; 364/167.01

[58] Field of Search ......................... 228/102, 7, 9, 25; 219/121.64, 121.79; 318/570, 572, 573, 574, 569; 374/170, 168, 169; 445/30

[56] References Cited

U.S. PATENT DOCUMENTS

| | | | |
|---|---|---|---|
| 4,281,385 | 7/1981 | Nakaso et al. | 364/170 X |
| 4,523,287 | 6/1985 | Kogawa | 318/573 |
| 4,636,960 | 1/1987 | McMurtry | 318/572 |
| 4,695,761 | 9/1987 | Fendley | 313/408 |

*Primary Examiner*—Kenneth J. Ramsey

[57] ABSTRACT

This disclosure describes a method and apparatus in the manufacture of flat tension mask cathode ray tubes, for detecting the edges of a mask receiving surface in a plane, recording its coordinates and subsequently delineating the path of an attachment device for permanently affixing a tensed foil shadow mask to the mask receiving surface of a mask support structure.

5 Claims, 5 Drawing Sheets

RAIL MAPPING METHOD AND APPARATUS

CROSS REFERENCE TO RELATED APPLICATIONS

This application is related to, but in no way depends upon, copending application Ser. No. 138,994, filed Dec. 29, 1987, and corresponding pending application Ser. No. 058,095, filed June 4, 1987, both of common ownership herewith.

BACKGROUND OF THE INVENTION

1. Field of the Invention

This invention applies to assembling parts in the manufacture of flat tension mask color cathode ray tubes. More specifically, the invention provides means for mapping the path of and positioning an attachment device for affixing a thin tensed foil shadow mask to the mask receiving surface of a mask support structure.

In particular the invention relates to a portion of the process steps employed in the manufacture of the front assembly of a flat tension mask color cathode ray tube. A front assembly includes a flat glass panel, ground flat on one side defined as the inner surface of the panel, a support structure affixed to the inner surface of the panel and a tensed foil shadow mask permanently attached to the support structure with proper registration relative to the color emitting phosphors, applied to the inner surface within the boundaries imposed by the support structure perimeter. Such a front assembly is described in U.S. Pat. No. 4,686,416.

2. Definitions

Certain definitions of terms and phrases used in this disclosure add to the clarity of the description of the invention.

Tube: The term "tube" in this disclosure means a flat tension mask cathode ray tube such as that used as a color television receiver screen or as a color computer monitor screen.

Panel: The front portion of the tube which functions as the viewing screen is a relatively thick flat glass plate.

Mask: An essential part of a tube is a thin metal shadow mask placed close to and behind the inner surface of the panel. In the preferred embodiment of this disclosure, the shadow mask is described as being made of steel and as being permanently affixed to a support structure by means of laser welding.

Support Structure and Rail: For proper functioning of a cathode ray tube, the mask is permanently installed, with proper registration, in a plane fixed at a specified distance from the inner surface of the panel. This specified distance is commonly called the "Q" spacing of the tube and is related to electrical and mechanical geometry of the tube. For the purpose of illustration, the Q spacing of a typical 14" diagonal screen flat tension mask cathode ray tube is approximately 0.290". This dimension is used as the specified distance in the description of the preferred embodiment. The support structure may be part of the panel or made of separate elements attached to the panel. In this document, the metal rectangular structure is called the "support structure". Any one side of the support structure is called a "rail".

Land and Mask Receiving Surface: In preparation for welding, the top surface of the support structure is ground flat. The ground surface of the support structure to which the mask is welded is called the "land" or the "mask receiving surface".

Mapping: The total process of detecting the position of the edges of the mask receiving surface on the support structure, recording its coordinates and computing the exact path to be followed by the welding head is called "mapping".

3. Reference to Prior Art

There is no known prior art related to mapping the coordinates of a path to be followed by an attachment device for the purpose of affixing a tensed foil shadow mask, called a mask, to the support structure of a flat tension mask cathode ray tube.

4. Problems in the Manufacture of Fixed Mask Tubes

A reason for rigid and permanent attachment of the mask to the support structure of a tube is to maintain tension on the mask so it retains its shape and exact registration with the color emitting phosphors deposited on the inner surface of the panel during normal operation of the tube.

What follows is a list of problems addressed and solved by the invention:

A. Unpredictability of Support Structure Position

The support structure is made of a 28% chromium-iron alloy commonly known as "Carpenter Glass Sealing 27". Each of four rails is longitudinally formed into a "V" shape from sheet material approximately 0.024" thick. The four rails are spot welded at the corners of a rectangle. Manufacturing variances contribute to deviations from an ideal rectangle. The rectangular frame with V-shaped cross section is frit sealed to the panel. Experience has shown that it is difficult to bond the support structure to the panel within close tolerances.

B. Variable Width and Height of the Mask Receiving Surface

The available and variable width of the mask receiving surface places constraints on the attachment process. The mask must be precisely installed relative to the inner surface of the panel. The plane of the mask must be parallel to the plane of the inner surface, and it must be a precise distance from the inner surface. Also, it must be registered with respect to the color emitting phosphor dots on the panel in exactly the same way it was registered while the phosphors were being applied.

Variability in the height of the unfinished support structure is caused by the manufacturing processes used to form the metal parts and by the small variances in the fritting process. Height of the support structure is controlled by grinding the narrow edge of the rails to produce a mask receiving surface plane approximately 0.290" (plus or minus 0.002") from the inner surface of the panel.

The grinding process produces a land on the support structure typically 0.06" in width which, in practice, can vary from 0.03" to 0.10". In the process of affixing the mask to the mask receiving surface, a large number of welds, each approximately 0.01" diameter, are placed at intervals of approximately 0.02". For proper attachment of the mask to the support structure, all welds must be placed between the edges of the mask receiving surface.

C. Accessibility of the Path

Fundamental to the art of manufacturing flat tension mask tubes is the requirement that the mask be permanently attached to the panel in exactly the same relative position maintained during all other processes used to make the tube. Further, the requirements of the finished tube demand that the mask be very thin (0.001" thick, for example) and that it be perfectly flat. To assure flatness during assembly and during its normal operation where it encounters significant continuous temperature changes, the mask is retained under tension in two directions throughout the entire tube manufacturing process. This is achieved by clamping the mask in a sturdy but movable frame. During all processes, registration of the mask relative to the panel is maintained by means of ball and groove mechanical indexing devices that repeatedly reproduce proper registration as the separate parts are handled.

This same rigid frame and locating means are used to position the mask during the welding process. When in position for welding, the mask and the frame cause the welding path to be hidden from view and inaccessible to any type of follower system or visually controlled positioning process.

By necessity, the welding path must be defined on the basis of measurements made before the mask is placed in its final position.

OBJECTIVES AND ADVANTAGES OF THE INVENTION

A primary object is to provide method and means for locating a mask receiving surface within a horizontal plane with sufficient accuracy (within plus or minus 0.002", for example) to permit delineation of a path to be followed by a welding head to permanently affix a mask to the mask receiving surface of a support structure of a flat tension mask cathode ray tube.

A second object of the invention is to provide method and means for mapping the true position of the mask receiving surface of the support structure of a tube.

Another object of the invention is to provide a method and means for computing the coordinates of a path on the mask receiving surface of the support structure of a tube wherein all points on the computed path fall sufficiently within the edges of the mask receiving surface to permit production of welds that fall entirely between the edges of the mask receiving surface.

A further object of the invention is to provide method and means for computer controlled automatic positioning of a weld head along the computed welding path on the mask receiving surface of the support structure.

An additional object of the invention is to provide a means for accepting or rejecting any mask receiving surface on the basis of tolerances specified for its proper location on the panel.

The advantage of the invention is that it solves all of the aforementioned problems related to manufacturing processes and it provides a fast and efficient means for insuring proper placement of mask welds on the support structure of a flat tension mask cathode ray tube.

BRIEF DESCRIPTION OF THE DRAWINGS

Ten drawings are sufficient to explain the invention.

DESCRIPTION OF THE PREFERRED EMBODIMENT

Geometry of the Panel Assembly

Figure 1:
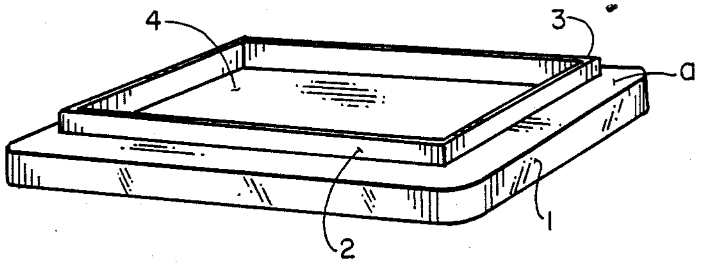
FIG. 1 shows the panel with the support structure and illustrates mechanical details of the panel assembly. Typical distortions encountered in manufacturing operations are illustrated.

The panel 1 with its support structure 2 is shown in FIG. 1. The mask receiving surface 3, known as the land, is ground to a height of typically 0.290" above the inner surface 4 of the panel.

The panel 1 is a glass plate which is rigid and strong relative to more delicate nature of the support structure 2. FIG. 1 illustrates details related to the mask 5 and its attachment to the support structure 2 by means of the weld 6. The support structure is attached to the panel 1 by heating the frit material 7 to 435° C.

Figure 1A:
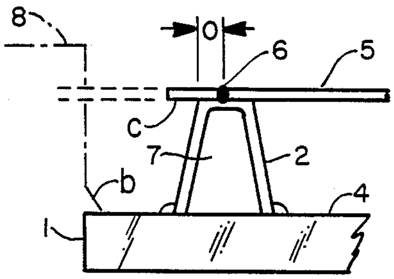

FIG. 1*a* illustrates a cross sectional detail of the support structure and panel assembly with the mask 5 welded in place. Experience with production practices has determined that the weld 6 should be offset approximately 0.020" from the outer edge of the support structure 2 as indicated by the distance o. Prior to and during the welding operation, the mask is retained in a tensed condition by the rigid frame 8. The panel 1 is registered relative to the mask by a means, not part of this invention, suggested at b. It is evident, as shown by the dotted lines that the rail of the support structure 2 is obscured from view and is inaccessible to any direct mechanical or optical position detection means while the welding process is being executed.

After welding is completed, another pass of the laser beam with an additional offset to a position indicated at c (approximately 0.032" from the outer edge of the support structure), is made about the support structure to cut the mask 5 from the rigid frame 8.

Figure 1B:
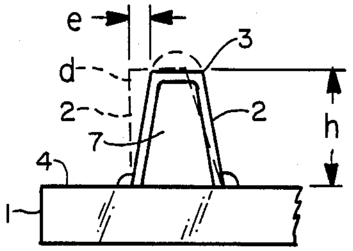

More details related to the rails of the support structure are shown in FIG. 1*b*. In the raw state, the rail of the support structure 2 has a rounded surface as suggested by the dotted lines. To achieve a precise and uniform height of typically 0.290" from the inner surface 4, as indicated by h, the support structure undergoes a grinding operation to produce a land 3 in a plane parallel to the plane of the inner surface 4 of the panel 1. The land 3 has a smooth and uniform finish to facilitate welding.

At d in FIG. 1*b*, a typical distortion of the support structure of unpredictable magnitude e is illustrated. In the formation of the parts of the support structure and during its fastening to the panel during the fritting processes, it is not unusual to experience unpredictable shifts in the position of the support structure 2 because of lateral shifts, rotations of the rails or stresses relieved in the materials during the heat treatment processes. Uncontrollable distortions make it impossible to predict the exact final location of the support structure at the time of the welding operation.

Figure 1C:
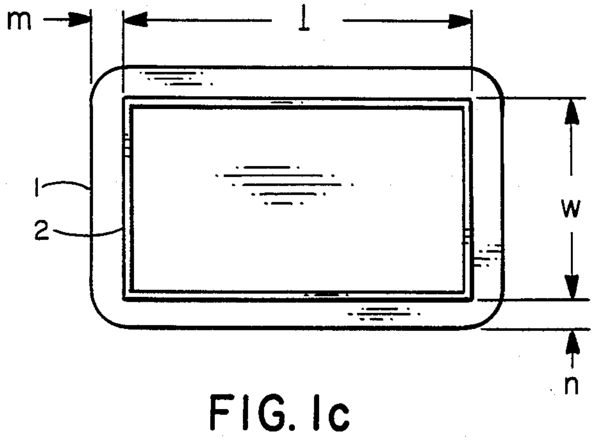
Figure 1D:
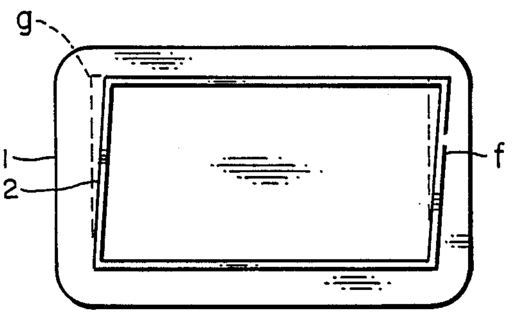

FIG. 1*c* shows the desired relationship of the support structure 2 to the panel 1. All rails are parallel to the edges of the panel and dimensions w, l, m and n are within a specified tolerance of plus or minus 0.025". In FIGS. 1*d*, an out-of-tolerance shift of a corner is suggested at g. Lateral shifts of the rails, as suggested at f, mean that the rails may not always be straight. These and other types of uncontrollable distortions indicate that the final shape of the support structure 2 and its position relative to the edges of the panel 1 is unpredictable.

Measurement Method

Figures 2, 3:
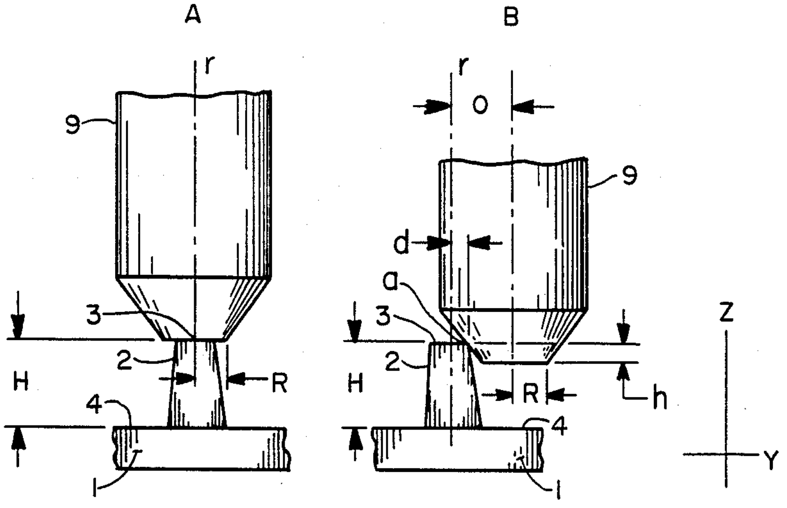
FIG. 2 shows a mechanical sensing probe, constrained to move only in the vertical Z axis, in one of two positions relative to the a rail of the support structure.
FIG. 3 shows a mechanical sensing probe, constrained to move only in the vertical Z axis, in the second of two positions relative to a the rail of the support structure.

FIG. 2 shows a gravity actuated mechanical sensing probe 9 free to move on a fixed vertical axis r parallel to the Z axis of the coordinate system of the panel 1 with its support structure 2. The position of the r axis is known and is, therefore, the basic reference axis for all dimensions in the measurement system. In FIG. 2 the probe 9 is shown resting on the land 3 of the support structure, a position used to measure the height of the land 3 above the inner surface 4 of the panel 1.

FIG. 3 shows the same mechanical sensing probe 9 in a second position relative to a rail of the support structure 2 such that the conical surface of the probe 9 is resting on the edge of the mask receiving surface 3, as shown at point a. This second position is used to determine the distance of the point a from the fixed vertical axis r of the probe 9.

Figure 4:
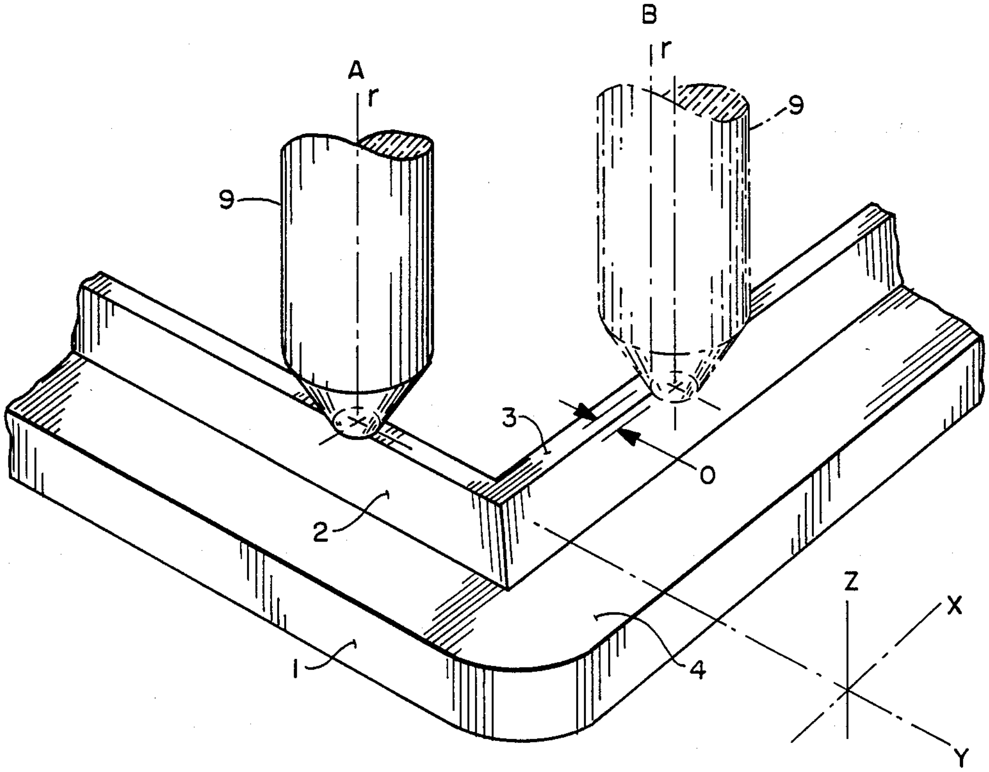
FIG. 4 illustrates a mechanical sensing probe, constrained to move only in the vertical Z axis, in both of two positions relative to a rail of the support structure.

FIG. 4 shows the two probe positions corresponding to FIG. 2 and FIG. 3. At position A, the tip of the probe 9 is shown to be resting on the land 3 of the support structure 2. At position B the probe 9 is shown in an offset position, designated by the dimension o with the probe 9 resting on one edge of the mask receiving surface 3.

Since the axis r of the probe 9 is fixed in the XY plane, motion of the probe relative to the panel 1 is achieved only by moving the panel 1 via an XY table positioning mechanism on which the panel 1 is placed while measurement is being executed.

The length of the probe has little significance, but the general shape of the tip of the probe 9 is fundamental to the success of the invention. The tip of the probe is depicted as having a truncated conical tip with an included angle of 90°. In practice this has proved to be a convenient design even though other configurations might function equally well. The fact that this particular probe is angled at 45° presents certain advantages soon to become apparent.

FIG. 2, FIG. 3 and FIG. 4 illustrate the principle of defining points in an XY plane with only vertical probe motion. First, the probe measures the height of the mask receiving surface 3 by resting the flat end of the probe 9 as shown for position A. This measurement serves two purposes. The height of the rail is verified as being acceptable or unacceptable in height, and a datum reference for the height H is recorded. In normal operation of the measuring system, one height reading is recorded for each rail of the support structure 2.

Next, the XY table is positioned such that the rail of the support structure 2 is displaced laterally a known distance o and the probe 9 is allowed to rest on the edge of the rail as shown for position B. With the probe 9 in contact with the rail at point a, it is evident that the probe is displaced a vertical distance h from the recorded elevation H in view A. The displacement h is a direct function of the exact lateral position of the edge of the mask receiving surface 3 at point a.

For a probe 9 with an included angle of 90°, position relative to the axis r is stated by the following formula:

| $d = (o - R) - h$ |
|---|
| where,<br>d = lateral distance from axis r<br>o = planned offset<br>R = radius of the probe tip<br>h = measured vertical displacement |

The range of the probe 9 is ½ the difference in the tip radius and the radius of the body of the probe at its major diameter. The offset o is related to this range in that in the offset position, the mask receiving surface 3 must be in contact with the conical surface of the probe.

With constant offset o and radius R, the distance from the axis r to a point a on the edge of the mask receiving surface is directly related to the vertical displacement h. Clearly, therefore, a probe 9 typical of the configuration shown in FIG. 2 can measure the lateral position of a point on the edge of a mask receiving surface 3 relative to a known vertical axis r perpendicular to an XY plane encompassing the plane of the mask receiving surface 3.

While FIG. 4 shows the XY plane as being a horizontal plane and the Z axis is shown as being vertical, there is nothing to prevent the invention being used in other orientations of the coordinate system. The most practical embodiment employs gravity as an actuation force for the probe 9 making it most useful to orient the system components as shown in FIG. 4. With some other orientation, a force other than gravity may be required to operate the probe 9.

Position Determination

To map points in an XY plane, the direction of a deviation from a known vertical axis r must be known as well as the magnitude d of the deviation.

Figure 5:
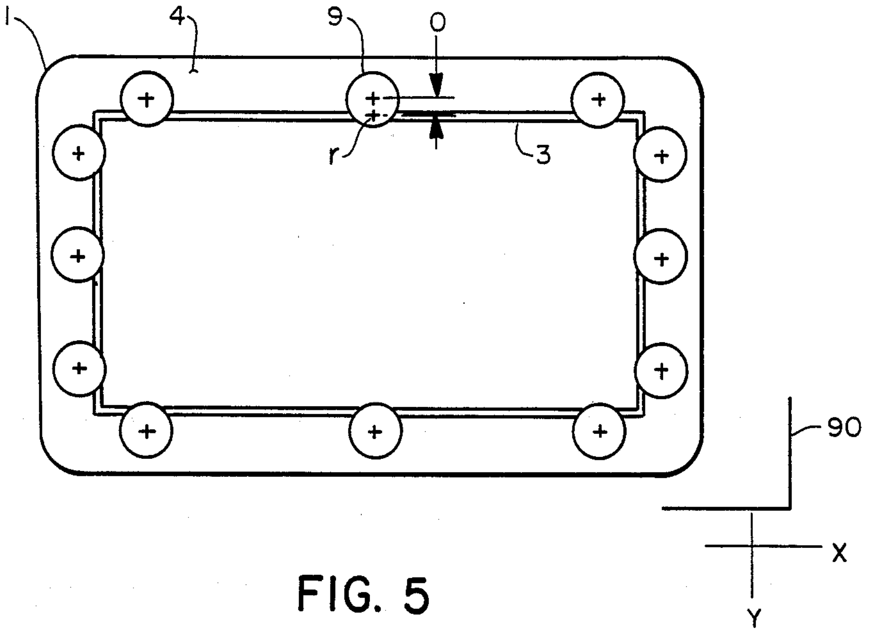
FIG. 5 illustrates the positioning of the mechanical sensing probe at twelve locations about the mask receiving surface to measure the precise positions of the edges of the mask receiving surface at those twelve points.

FIG. 5 shows the panel 1 and support structure 2 in twelve measurement positions relative to the fixed vertical axis r of the probe 9. That is, the probe 9 is shown in the offset position by a distance o at all twelve locations. All twelve measurements are made on the outside edges of the mask receiving surface 3. The direction of the deviation d, to be seen in FIG. 3, from the axis r is a direct function of the position of the XY positioner table 90 on which the panel 1 is mounted.

The mapping system is designed such that it accepts a panel 1 with a mask receiving surface 3 on a support structure 2 within acceptable tolerances of the "ranges" of the sensing probe 9 at all twelve points of measurement. Panel assemblies with mask receiving surfaces falling out-of-range are rejected by the measuring system and its related control system.

A combination of the magnitude of deviation d from a known reference axis r and the known relative position of the probe 9 to the edge of the mask receiving surface 3 is sufficient information to program an XY positioner for welding a mask 5 to a mask receiving surface 3.

Mathematical Concept

Figure 6:
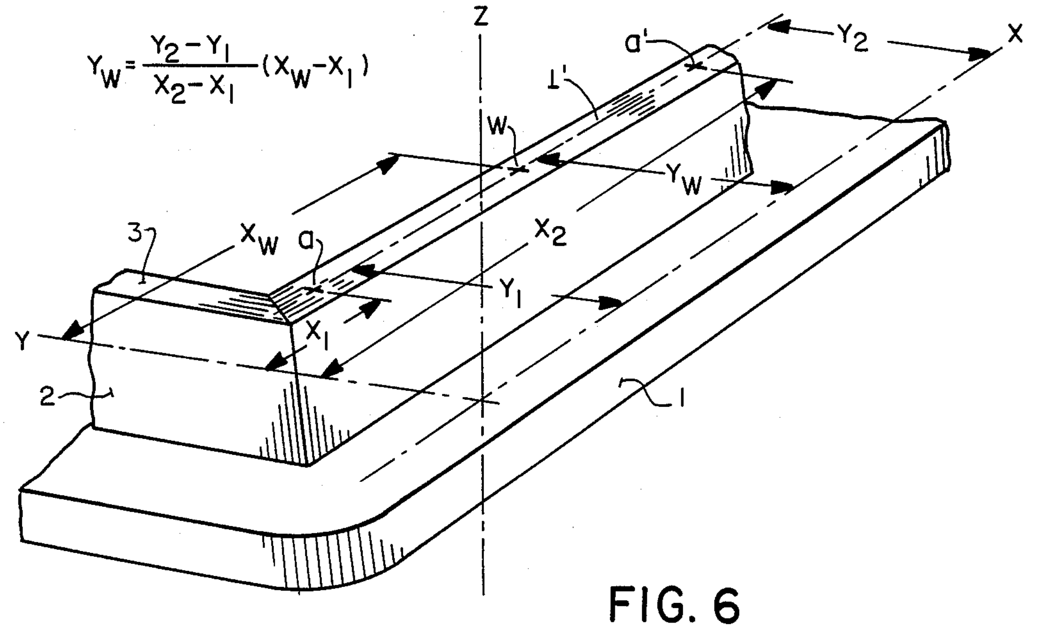
FIG. 6 illustrates a mathematical technique for delineating the path to be followed by the welding head.

FIG. 6 illustrates a mathematical concept used to convert measured deviations d and transverse position relative to the mask receiving surface 3 to a path for guidance of a laser welding head. Using the measuring means previously described, the coordinates $(x_1,y_1)$ and $(x_2,y_2)$ of the two points a and a' are determined. These points are locations in the XY plane of the mask receiving surface 3 and ultimately the XY plane of the laser beam focused by the welding head.

With known coordinates, the equation shown (that of a straight line) is used to determine any point w represented by coordinates $(x_w,y_w)$. Those skilled in the art of programming numerically controlled machine tools are, therefore, capable of instructing a computer to position a laser beam along such a delineated path by providing proportional offset to the position of the laser beam as the beam progresses in the X direction along the line l'. FIG. 6 shows one of eight line segments delineated by the mapping system. Twelve points permit delineation of eight line segments to be traced by the laser beam in the process of welding the mask 5 to the mask receiving surface 3 around the full perimeter of the support structure 2.

Description of the Mechanism

Figure 7:
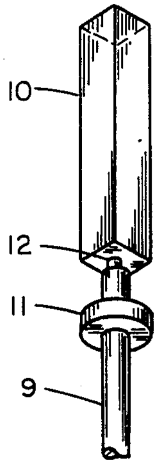
FIG. 7 shows a mechanical sensing probe coupled to a transducer with a magnetic coupling device.
Figure 7A:
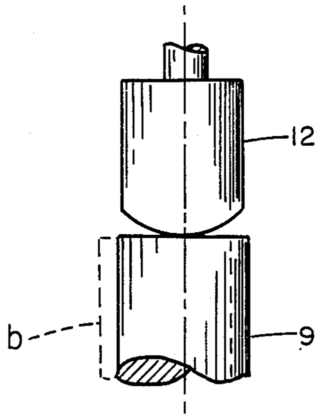
FIG. 7*a* is a detailed view of the magnetic coupling device connecting the mechanical sensing probe to its transducer.

FIG. 7 shows the relationship of the probe 9 to its position sensing transducer 10. The probe 9 is shown to be coupled on substantially the same vertical axis as that of the transducer 10. FIG. 7*a* illustrates that advantage of using a magnetic coupler 12 with a spherical shaped tip in that lateral misalignments as suggested by the phantom lines, denoted b do not restrict freedom of motion. A lifting collar 11 is affixed to the top of the probe. The lifting collar 11 allows the probe 9 freedom of rotation while providing a lifting surface. The lack of rigid restraints in the coupling mechanism and freedom to rotate enhance the free movement of the probe 9 under the force of gravity.

The transducer 10 is a film type potentiometer with a 2 inch stroke. A Waters Manufacturing Company Model SLF-50D Short Longfellow Transducer is suitable.

Figure 8:
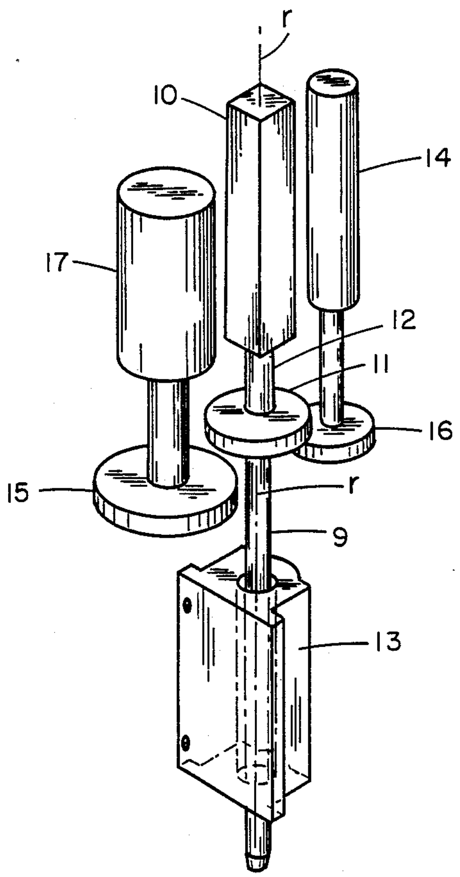
FIG. 8 shows the arrangement of the mechanical sensing probe, its transducer, its support bearing and its operating mechanism.

FIG. 8 depicts a more comprehensive view of the probe and its operating mechanism and illustrates that the probe 9 is operated by a two stage actuation system giving it a wide range of vertical motion to enable it to clear the sides of the tooling holding the panel 1 while mapping is taking place.

Motion of the probe 9 with its lifting collar 11 is limited to the vertical r axis, of known fixed position, by a ball sleeve bearing pillow block 13.

Operation occurs in two cycles. A long stroke air cylinder 14 fitted with a lifting collar 16 acts on the lower surface of the probe lifting collar 11 and lowers the probe 9 extending the slider of the transducer 10. From a fully retracted position, the probe and the transducer slider move down approximately 1.7 inches until the probe lifting collar 11 rests on the lifting collar 15 of a fully retracted short stroke air cylinder 17.

The purpose of the long stroke air cylinder 14 is to lift probe 9 out of the way of the tooling on the XY table 90 when measurements are not being made and to lower the probe at the start of the measurement cycle to place the tip in close proximity to the support structure 2. This lowering function is denoted as the "loading stroke" since it occurs only once at the start of the measuring cycle. At the end of the measuring cycle this action occurs in reverse, moving the probe out of the way of the panel assembly and tooling.

Fixtures on the XY table can then move freely around and under the probe 9 during the welding cycle. Independent of the long stroke cylinder 14, the short stroke air cylinder 17 raises and lowers the probe 9 during the measuring cycle. Vertical motion of the probe during the measuring cycle is on the order of 0.1 inch.

Figure 9:
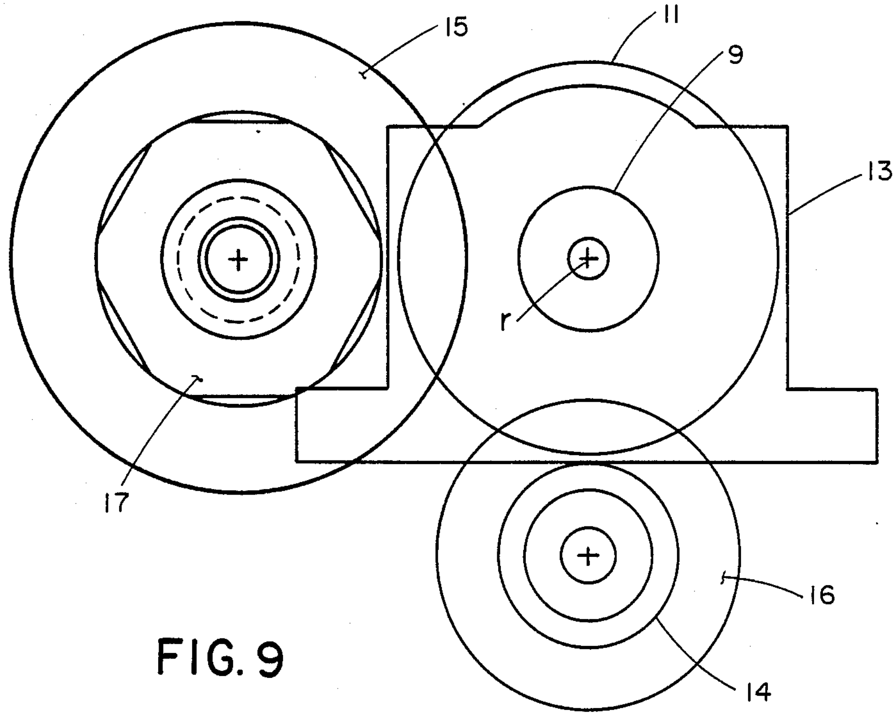
FIG. 9 is a plan view showing the physical relationship of the moving parts.

For further clarity, FIG. 9 shows a plan view of the several collars 11, 15 and 16, the two air cylinders 14 and 17, the pillow block 13 and the probe 9 with its lifting collar 11. The axes of the cylinders and the probe differ in position. The collars are of suitable diameter to bridge the distances between centers.

Figure 10:
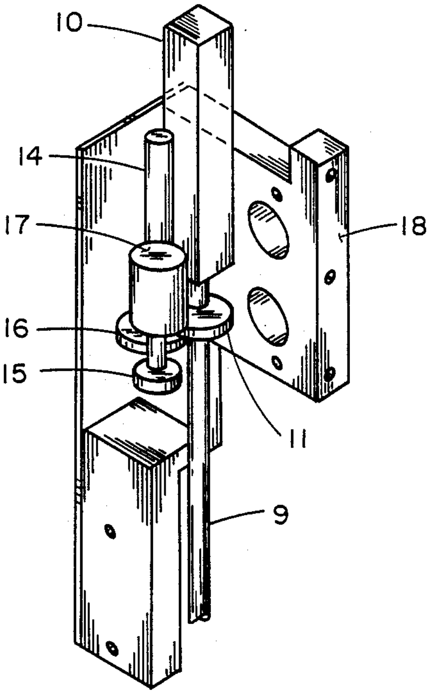
FIG. 10 shows how the mechanical sensing device operating mechanism is installed on a mounting plate used to mount the mechanism to the frame of a laser welding machine.

FIG. 10 is a drawing showing the relative positions of the various elements of the mechanism mounted on a support plate 18 which in turn is fastened securely to the fixed structure of the welding machine.

Operation

This section briefly describes the complete operating cycle of the rail mapping sensing device.

With the probe 9 fully retracted by the long air cylinder 14, the short cylinder 17 in its retracted position and with the XY table 90 in its starting position, the welding machine operator places the panel 1 with the support structure 2 in the holding fixture on the XY table. The cycle is now ready to start.

The computer positions the XY table 90 at the first of three points to be measured on a rail of the support structure 2. Two probe measurement motions are activated at the first position on each rail.

The loading stroke now occurs lowering the lifting collar 11 of the probe 9 until it comes to rest on the lifting collar 16 of the short stroke cylinder which is in its retracted position. The probe 9 is now in position to start the measurement cycle at the first point. At this point, the center of the probe 9 is concentric with the vertical axis r of known position and is positioned such that the flat tip will rest on the land of the mask receiving surface 3 of the support structure 2 when lowered. Next the short stroke cylinder 17 is activated allowing the probe 9, under the force of gravity, to come to rest on the land of the mask receiving surface 3 as depicted in FIG. 2. In this position, a voltage measurement is made using the transducer 10 and its associated instrumentation, not part of this invention, thereby recording a datum elevation for the land of the mask receiving surface 3 at this measurement point. This datum reference is used for the remaining two measuring points on the same rail.

Once the datum measurement is made, the short cylinder 17 lifts the probe 9 by means of its lifting collar 15 acting on the probe lifting collar 11. The XY table 90 under control of its computer moves in the X (or Y) axis a offset distance (indicated in the drawings as o) exactly 0.156 inches in a direction away from the center of the panel 1 to a new position wherein the center of the probe is in an offset position outwardly away from the edge of the land of the mask receiving surface 3.

In this new position, as depicted in FIG. 3, the short stroke cylinder 17 lowers the probe 9 by means of lifting collars 11 and 15, and the conical part of the probe 9 under the force of gravity comes to rest on the edge of the mask receiving surface 3. Now, the tip of the probe 9 is at a lower elevation, as indicated by the distance h in FIG. 3, than was the case during the measurement of the datum elevation.

Thus, the new vertical position, extends the slider of the transducer 10 and another voltage reading is taken by the system instrumentation.

As explained by prior discussion in this disclosure, sufficient information is now available both in terms of location and vertical deflection to calculate within close limits a point on the path to be followed by the welding head.

With this two cycle measurement complete, the probe 9 is retracted by the short cylinder 17; and, then, the computer positions the XY table 90, in sequence, to each of two other measuring points on the same rail where additional off rail measurements are made.

Once three measurements are completed on one rail, the cycle is repeated for each of the other three rails.

When all of the points are measured and the short cylinder 17 is in its retracted position, the long cylinder 14 is activated to retract the probe 9 to its fully elevated position. With the measurement cycle complete, the computer determines the true path to be followed by the welding head. The operator loads the mask 5 in its rigid frame 8 on the XY table in contact with the mask receiving surface 3, and welding and cutting, not part of this invention are executed.

While particular embodiments of the invention have been shown and described, it will be obvious to those skilled in the art that changes and modifications may be made without departing from the invention in its broader aspects; and, therefore, the aim in the appended claims is to cover all such changes and modifications as fall within the true spirit and scope of the invention.

What is claimed is:

1. In the manufacture of a fixed tensed foil mask cathode ray tube which includes a glass front panel having a mask support structure on a planar inner surface thereof for receiving a foil mask, said support structure having a finished mask receiving surface, apparatus for detecting the position of said mask receiving surface on said support structure and for delineating a path to be traced by an attachment device for affixing a tensed foil shadow mask to said mask receiving surface, said apparatus comprising:

mechanical means including a probe for detecting, within a plane, edges of said mask receiving surface to define the position of said edges on said mask receiving surface in said plane, said probe including a flat end portion for detecting the height of said mask receiving surface from the inner surface of the glass front panel and a truncated conical portion for detecting the edges of said mask receiving surface when said probe is displaced generally parallel to the planar inner surface of the glass front panel;

means for encoding coordinates of defined points on said edges of said mask receiving surface in said plane;

means responsive to said coordinates for comparing the positions of said edges of said mask receiving surface to predetermined dimensional limits for acceptance or rejection of said position of said edges of said mask receiving surface within said plane;

means responsive to said coordinates of said defined points for computing coordinates of points on a path to be traced by said attachment device for affixing said mask to said mask receiving surface; and means responsive to said computed coordinates of said points on said path for effecting relative movement between said mask receiving surface and said attachment device to permit said mask to be affixed to said mask receiving surface.

2. In the manufacture of a fixed tensed foil mask cathode ray tube which includes a glass front panel having a mask support structure on a planar inner surface thereof for receiving a foil mask, said support structure having a finished mask receiving surface, apparatus for detecting the position of said mask receiving surface on said support structure and for delineating a path to be traced by an attachment device for affixing a tensed foil shadow mask to said mask receiving surface, said apparatus comprising:

means including a gravity-actuated mechanical probe having a tapered tip surface for detecting, within a plane, an edge of said mask receiving surface to define the position of said edge on said mask receiving surface in said plane;

means for generating and storing electrical signals from a transducer connected to said probe wherein said electrical signals represent elevations of said probe when a flat tip of said probe is resting on a ground surface of said mask receiving surface or elevations of said probe and when said probe is in an offset position and said tapered tip surface of said probe is resting on an edge of said mask receiving surface;

means for processing said stored electrical signals to compute positions of the point of contact of said probe with said edge of said mask receiving surface when said probe is in an offset position;

means for comparing the position of said computed point of contact with pre-established acceptable positions of said contact points for acceptance or rejection of said mask receiving surface as being in a usable position in said plane; and means for computing coordinates of points on said path to be traced by said attachment device for affixing said mask to said mask receiving surface wherein said path is offset a predetermined distance from one edge of said computed position of said edge of said mask receiving surface such that all points on said path on said mask receiving surface are between the two edges of said mask receiving surface and wherein said path is computed for the entire perimeter of the mask receiving surface.

3. In the manufacture of a fixed tensed foil mask cathode ray tube which includes a glass front panel having a mask support structure on a planar inner surface thereof for receiving a foil mask, said support structure having a finished mask receiving surface, apparatus for detecting the position of said mask receiving surface on said support structure and for delineating a path to be traced by an attachment device for affixing a tensed foil shadow mask to said mask receiving surface, said apparatus comprising:

means for detecting, within a plane, edges of said mask receiving surface, with said edges of said mask receiving surface being within the measuring range of a gravity actuated tapered mechanical probe to define the position of said edges on said mask receiving surface in said plane;

means for detecting and storing electrical signals from a transducer connected to said gravity actuated tapered mechanical probe wherein said electrical signals represent elevations of said gravity actuated tapered mechanical probe when a flat tip of said gravity actuated tapered mechanical probe is resting on a ground surface of said mask receiving surface or elevations of said gravity actuated tapered mechanical probe when said gravity actuated tapered mechanical probe is in an offset position and a conical surface of said gravity actuated tapered mechanical probe is resting on the edge of said mask receiving surface for use by calculating means for computing coordinates of said points on said edges of said mask receiving surface to define the position of said mask receiving surface in said plane;

means for processing said stored electrical signals to compute the positions of the points of contact of said gravity actuated tapered mechanical probe with said edge of said mask receiving surface when said gravity actuated tapered mechanical probe is in the offset position;

means for comparing the positions of said computed points of contact with preestablished acceptable positions of said contact points for acceptance or rejection of said mask receiving surface as being in a usable position in said plane;

means for computing coordinates of points on said path to be traced by said attachment device for affixing said mask to said mask receiving surface wherein said path is offset a predetermined amount from one edge of said computed position of said edge of said mask receiving surface such that all points on said path on said mask receiving surface are between the two edges of said mask receiving surface and wherein said path is computed for the entire perimeter of said mask receiving surface; and means for positioning said mask receiving surface within said plane, using said computed coordinates of said points and said path relative to the position of said attachment device, such that said mask is affixed to said mask receiving surface wherein said attachment device is a laser welder mounted on an XY position system such that computer controlled equipment cause a focused beam of said laser welder to trace said path such that all welds produced by said focused laser beam are positioned between the two edges of said mask receiving surface.

4. In the manufacture of a fixed tensed foil mask cathode ray tube which includes a glass front panel having a mask support structure on a planar inner surface thereof for receiving a foil mask, said support structure including a plurality of rails and having a finished mask receiving surface, apparatus for detecting the position of said mask receiving surface on said support structure and for delineating a path to be traced by an attachment device for affixing a tensed foil shadow mask to said mask receiving surface, said apparatus comprising:

means for detecting, within a plane, edges of said mask receiving surface at twelve points by positioning said glass front panel, with said support structure having said ground mask receiving surface, relative to a fixed vertical axis of a gravity actuated tapered mechanical probe, wherein said glass front panel with said support structure having said mask receiving surface is placed on a computer controlled XY positioning table which is programmed to position said support structure with said mask receiving surface under said gravity actuated tapered mechanical probe in such a manner that one measurement for elevation of each rail of said support structure is made by lowering said gravity actuated tapered mechanical probe to said mask receiving surface such that a flat tip of said gravity actuated tapered mechanical probe rests on said mask receiving surface, and by positioning said computer controlled XY table to an offset position to cause said gravity actuated tapered mechanical probe, when lowered, to rest on the edge of said mask receiving surface such that the point of contact with said mask receiving surface rests against a conical surface of said gravity actuated tapered mechanical probe;

means for detecting and storing electrical signals from a transducer connected to said gravity actuated tapered mechanical probe wherein said electrical signals represent elevations of said gravity actuated tapered mechanical probe when the flat tip of said gravity actuated tapered mechanical probe is resting on a ground surface of said mask receiving surface or elevations of said gravity actuated tapered mechanical probe when said gravity actuated tapered mechanical probe is in an offset position and the conical surface of said gravity actuated tapered mechanical probe is resting on the edge of said mask receiving surface for use by calculating means using a formula for relating the amount of said offset and the differences in elevation from a datum elevation of said gravity actuated tapered mechanical probe to that of the elevation of said gravity actuated tapered mechanical probe when in said offset position to calculate the distance of said edge of said mask receiving surface from a fixed vertical axis of said gravity actuated tapered mechanical probe, and by relating said computed distance from said fixed vertical axis to the observed direction, outwardly from said edge of said mask receiving surface, the position of said point of said mask receiving surface with said conical surface of said gravity actuated mechanical probe is determined in said plane;

means for comparing the position of said computed point of contact with preestablished acceptable positions of said contact points for acceptance or rejection of said mask receiving surface as being in a usable position in said plane;

means for computing coordinates of points on said path to be traced by said attachment device for affixing said mask to said mask receiving surface wherein said path is offset a predetermined amount from one edge of said computed position of said edge of said mask receiving surface such that all points on said path on said mask receiving surface are between the two edges of said mask receiving surface and wherein said path is computed for the entire perimeter of said mask receiving surface; and means for positioning said glass front panel with said support structure having said mask receiving surface within said plane, using said computed coordinates of said points of said path to guide a computer controlled XY table, relative to the fixed position of said attachment device, wherein said attachment device is a laser welding head, such that said mask is affixed to said mask receiving surface and wherein all welds made by a focused beam of said laser welding head are placed between the two edges of said mask receiving surface.

5. In the manufacture of a fixed tensed foil mask cathode ray tube which includes a glass front panel having a mask support structure on a planar inner surface thereof for receiving a foil mask, said support structure including a plurality of rails and having a finished mask receiving surface, a method for detecting the position of said mask receiving surface on said support structure and for delineating a path to be traced by a focused beam of a laser welding head being part of a machine system for attaching a tensed foil shadow mask to said mask receiving surface, said method comprising the steps of:

detecting, within a plane, edges of said mask receiving surface at twelve points by positioning said glass front receiving surface, relative to a fixed vertical axis of a gravity actuated tapered mechaniçal probe, wherein said glass front panel with said support structure having said mask receiving surface is placed on a CNC computer controlled XY positioning table which is programmed to position said support structure with said mask receiving surface under said gravity actuated tapered mechanical probe in such a manner that one measurement for elevation of each rail of said support structure is made by lowering said gravity actuated tapered mechanical probe to said mask receiving surface such that a flat tip of said gravity actuated tapered mechanical probe rests on said mask receiving surface, and by positioning said computer controlled XY table to an offset position to cause said gravity actuated tapered mechanical probe, when lowered, to rest on the edge of said mask receiving surface such that the point of contact with said mask receiving surface rests against a conical surface of said gravity actuated tapered mechanical probe;

detecting and storing electrical signals from a transducer connected to said gravity actuated tapered mechanical probe wherein said electrical signals represent elevations of said gravity actuated tapered mechanical probe when the flat tip of said gravity actuated tapered mechanical probe is resting on a ground surface of said mask receiving surface or elevations of said gravity actuated tapered mechanical probe when said gravity actuated tapered mechanical probe is in an offset position and the conical surface of said gravity actuated tapered mechanical probe is resting on the edge of said mask receiving surface for use by calculating means using a formula for relating the amount of said offset and the differences in elevation from a datum elevation of said gravity actuated tapered mechanical probe to that of the elevation of said gravity actuated tapered mechanical probe when in said offset position to calculate the distance of said edge of said mask receiving surface from a fixed vertical axis of said gravity actuated tapered mechanical probe, and by relating said computed distance from said fixed vertical axis to the observed direction, outwardly from said edge of said mask receiving surface, the position of said point of said mask receiving surface with said conical surface of said gravity actuated mechanical probe is determined in said plane;

comparing the position of said computed point of contact with preestablished acceptable positions of said contact points for acceptance or rejection of said mask receiving surface as being in a usable position in said plane;

computing the coordinates of points on said path to be traced by said attachment device for affixing said mask to said mask receiving surface wherein said path is offset a predetermined amount from one edge of said computed position of said edge of said mask receiving surface such that all points on said path on said mask receiving surface are between the two edges of said mask receiving surface and wherein said path is computed for the entire perimeter of said mask receiving surface; and positioning said glass front panel with said support structure having said mask receiving surface within said plane, using said computed coordinates of said points of said path to guide a computer controlled XY table relative to the fixed position of said attachment device, wherein said attachment device is a laser welding head, such that said mask is affixed to said mask receiving surface wherein all welds made by a focused beam of said laser welding head in tracing said path are placed between the two edges of said mask receiving surface.

* * * * *